(12) United States Patent
Erickson et al.

(10) Patent No.: US 8,136,328 B2
(45) Date of Patent: Mar. 20, 2012

(54) FASTENER RECEPTACLE FOR A PANEL

(75) Inventors: Harold G. Erickson, Mukilteo, WA (US); Douglas A. Brown, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 66 days.

(21) Appl. No.: 12/128,569

(22) Filed: May 28, 2008

(65) Prior Publication Data

US 2009/0293421 A1 Dec. 3, 2009

(51) Int. Cl.
*E04C 2/54* (2006.01)
*F16B 37/02* (2006.01)

(52) U.S. Cl. ........................ 52/787.1; 411/173
(58) Field of Classification Search .............. 52/787.1, 52/36.5, 309.15; 244/129.1, 131, 132; 411/173, 411/82, 372.5, 511
See application file for complete search history.

(56) References Cited

U.S. PATENT DOCUMENTS

| | | | | |
|---|---|---|---|---|
| 2,649,884 A | * | 8/1953 | Westover | 411/173 |
| 3,019,865 A | * | 2/1962 | Rohe | 52/787.12 |
| 3,137,887 A | * | 6/1964 | Mannino et al. | 16/2.1 |
| 3,173,520 A | * | 3/1965 | Fisher | 52/309.3 |
| 3,252,493 A | * | 5/1966 | Smith | 411/108 |
| 3,285,311 A | * | 11/1966 | Cushman | 52/787.1 |
| 3,305,996 A | | 2/1967 | Shapiro | |
| 3,313,078 A | * | 4/1967 | Rohe | 52/787.1 |
| 3,313,079 A | * | 4/1967 | Phelan | 52/787.1 |
| 3,339,609 A | * | 9/1967 | Cushman | 411/82.1 |
| 3,355,850 A | * | 12/1967 | Rohe | 52/787.1 |
| 3,356,404 A | * | 12/1967 | Peters | 403/408.1 |
| 3,384,142 A | * | 5/1968 | Phelan | 411/166 |
| 3,443,473 A | * | 5/1969 | Tritt | 411/38 |
| 3,451,181 A | * | 6/1969 | Neuschotz | 52/787.1 |
| 3,485,282 A | * | 12/1969 | Frisman et al. | 411/82.5 |
| 3,512,328 A | * | 5/1970 | Eriksson | 52/787.1 |
| 3,526,072 A | * | 9/1970 | Campbell | 52/787.1 |
| 3,564,798 A | * | 2/1971 | Darby et al. | 52/787.1 |
| 3,579,942 A | | 5/1971 | Cole | |
| 3,646,981 A | * | 3/1972 | Barnes | 411/82 |
| 3,651,563 A | * | 3/1972 | Volkmann | 29/523 |
| 3,742,661 A | * | 7/1973 | Tye | 52/98 |
| 3,771,272 A | * | 11/1973 | Mihaly et al. | 52/787.1 |
| 3,778,957 A | * | 12/1973 | Appleberry | 52/22 |
| 3,803,670 A | * | 4/1974 | Johnson | 411/508 |
| 3,816,883 A | * | 6/1974 | Dzus et al. | 411/349 |
| 3,964,531 A | * | 6/1976 | Schenk | 411/82.1 |
| 3,977,146 A | * | 8/1976 | Wiley | 52/787.1 |
| 4,084,362 A | * | 4/1978 | Piazza | 52/309.2 |
| 4,118,855 A | * | 10/1978 | Lequeux | 29/447 |
| 4,212,610 A | * | 7/1980 | Weidlich et al. | 425/110 |
| 4,283,898 A | * | 8/1981 | Claver | 52/584.1 |
| 4,309,856 A | * | 1/1982 | Varnau et al. | 439/74 |
| 4,341,053 A | * | 7/1982 | Dettfurth et al. | 52/787.1 |
| 4,509,308 A | * | 4/1985 | Dettfurth et al. | 52/787.1 |
| 4,554,196 A | * | 11/1985 | Meeker | 428/67 |
| 4,698,945 A | * | 10/1987 | Munn | 52/220.2 |
| 4,800,643 A | * | 1/1989 | Higgins | 29/458 |
| 4,812,193 A | * | 3/1989 | Gauron | 156/293 |
| 4,902,180 A | * | 2/1990 | Gauron | 411/82.1 |
| 4,973,208 A | * | 11/1990 | Gauron | 411/82.1 |

(Continued)

*Primary Examiner* — Eileen D Lillis
*Assistant Examiner* — Andrew Triggs (57) ABSTRACT

A panel includes a core and a fastener receptacle extending into the core. The fastener receptacle has an internal hollow and an opening to the internal hollow. The opening is formed by a lip that can engage and structurally support a push-in fastener.

12 Claims, 7 Drawing Sheets

U.S. PATENT DOCUMENTS

| | | | |
|---|---|---|---|
| 4,981,735 A * | 1/1991 | Rickson | 428/36.9 |
| 5,082,405 A * | 1/1992 | Witten | 411/82 |
| 5,093,957 A * | 3/1992 | Do | 16/2.1 |
| 5,378,099 A * | 1/1995 | Gauron | 411/82.1 |
| 5,536,344 A * | 7/1996 | van Dreumel | 156/73.5 |
| 5,632,582 A * | 5/1997 | Gauron | 411/82.1 |
| 6,298,633 B1 * | 10/2001 | McCorkle et al. | 52/787.1 |
| 6,394,722 B1 * | 5/2002 | Kunt et al. | 411/82 |
| 6,453,633 B1 * | 9/2002 | Wilkinson et al. | 52/506.06 |
| 6,497,082 B1 * | 12/2002 | Toyoda et al. | 52/787.1 |
| 6,514,023 B2 * | 2/2003 | Moerke | 411/45 |
| 6,584,655 B1 | 7/2003 | Cardwell, III et al. | |
| 6,668,515 B2 * | 12/2003 | Bertin | 52/793.1 |
| 6,862,863 B2 * | 3/2005 | McCorkle et al. | 52/787.1 |
| 6,898,918 B2 * | 5/2005 | Eshraghi | 52/787.1 |
| 6,979,163 B2 * | 12/2005 | Brletich et al. | 411/418 |
| 7,195,436 B1 * | 3/2007 | Stephen | 411/82.1 |
| 7,197,852 B2 * | 4/2007 | Grillos | 52/144 |
| 7,207,762 B2 | 4/2007 | Teal | |
| 7,725,991 B2 * | 6/2010 | Lubera et al. | 24/295 |
| 2002/0176762 A1 * | 11/2002 | Moerke | 411/45 |
| 2003/0082026 A1 * | 5/2003 | Brletich et al. | 411/311 |
| 2005/0121560 A1 | 6/2005 | Slyter | |
| 2006/0010830 A1 * | 1/2006 | Warren et al. | 52/787.1 |
| 2006/0137294 A1 * | 6/2006 | Waits, Jr. et al. | 52/787.1 |
| 2008/0116094 A1 * | 5/2008 | Truong et al. | 206/338 |

* cited by examiner

FASTENER RECEPTACLE FOR A PANEL

BACKGROUND

A typical honeycomb panel includes facing skins that sandwich a honeycomb core. Honeycomb panels have an excellent strength-to-weight ratio. They are used by the aircraft industry for interior panels.

However, mounting a part to the surface of an aircraft interior panel is problematic, especially if only one surface of the panel is accessible. Driving a screw or other fastener directly into an interior panel is ineffective, as neither the skin nor the honeycomb core provides adequate structural support for the fastener.

Needed is an aircraft interior panel that can adequately support a fastener for surface mounting.

SUMMARY

According to an embodiment herein, a panel includes a core and a fastener receptacle extending into the core. The fastener receptacle has an internal hollow and an opening to the internal hollow. The opening is formed by a lip that can engage and structurally support a push-in fastener.

According to another embodiment herein, an aircraft interior panel includes a honeycomb core, a skin covering a surface of the honeycomb core, and a plurality of fastener receptacles. Each receptacle extends through the skin and into the core. Each receptacle includes a cylindrical cavity having a closed end, and an inwardly-extending annular lip spaced apart from the closed end. The annular lip forms an opening to the cavity. The opening has a smaller diameter than the cavity's diameter.

According to another embodiment herein, a fastener system for a panel includes a push-in fastener having a deformable end, and a fastener receptacle. The fastener receptacle includes a cylindrical sleeve having a cylindrical cavity, a cap for closing one end of the cavity, and an annular lip spaced apart from the closed end. The lip extends radially inward from the sleeve, and it forms an opening to the cavity. The lip can engage and structurally support the push-in fastener when the deformable end is inserted into the cavity.

DETAILED DESCRIPTION

Figure 1:
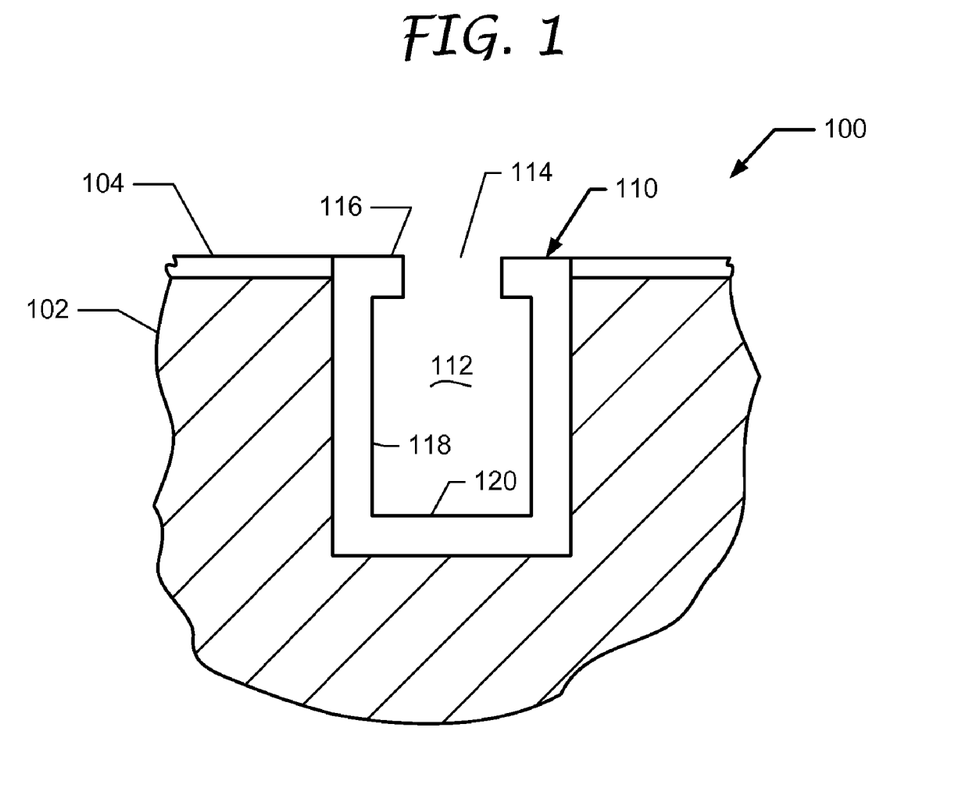
FIG. 1 is an illustration of a panel including a low density core and a fastener receptacle.

Reference is made to FIG. 1, which illustrates a panel 100 having a low-density core 102 and a skin 104 covering the core 102. A part can be surface mounted to the panel 100 by driving a screw or other fastener directly through the skin 104 and into the core 102. However, such surface mounting would be ineffective, as neither the skin 104 nor the low-density core 102 would provide adequate structural support for the fastener. Examples of such a panel 100 include, but are not limited to, a honeycomb panel, a skinned foam panel, a solid foam panel, a rubber panel, a low density wood (e.g., balsa) panel, etc.

The panel 100 further includes a fastener receptacle 110 that extends through the skin 104 and into the low density core 102. The receptacle 110 is affixed to the core 102, or the skin 104 or both the skin 104 and the core 102. The fastener receptacle 110 has an internal hollow 112 and an opening 114 to the internal hollow 112.

The opening 114 is formed by a lip 116. The lip 116 can engage and structurally support a push-in fastener. The push-in fastener includes an end that can be pushed past the opening 114 and into the internal hollow 112. Once inside the hollow 112, the fastener end expands and is thus retained in the internal hollow 112. Examples of push-in fasteners include, but are not limited to, push-in screws, S-rivets, quick-release posts, "Christmas-tree" style annular ribbed studs, and multi-pronged studs. A push-in fastener may be made of a material such as plastic or rubber.

Figure 2:
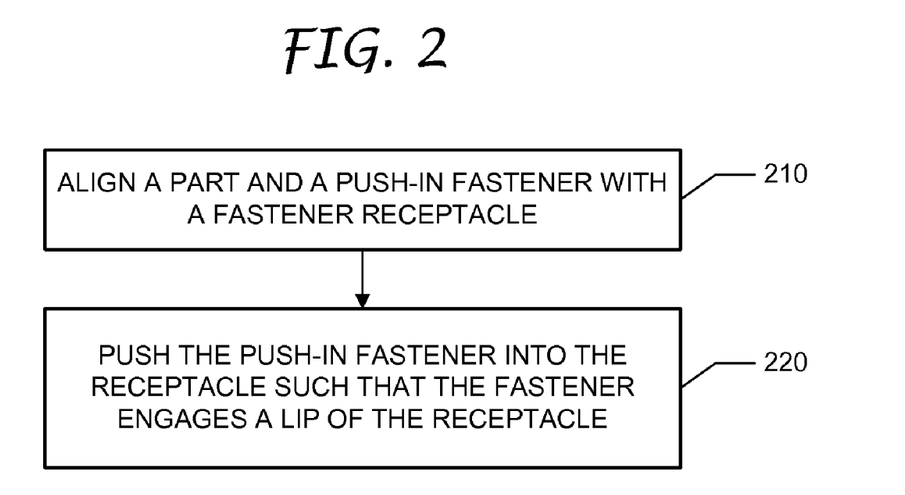
FIG. 2 is an illustration of a method of fastening a part to a panel having a low density core.

Additional reference is made to FIG. 2, which illustrates a method of surface mounting a part to the panel 100. At block 210, the part and a push-in fastener are aligned with the receptacle 110. At block 220, the push-in fastener is pushed into the receptacle 110 such that the fastener engages the lip 116.

Figure 3:
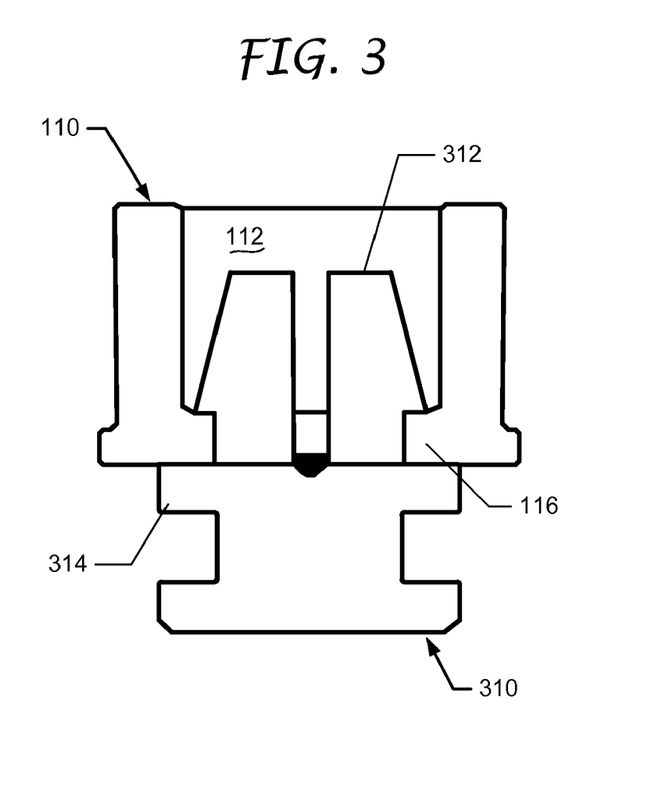
FIG. 3 is an illustration of a fastener engaging a lip of a fastener receptacle.

Reference is made to FIG. 3, which illustrates how the lip 116 of the fastener receptacle 110 may be engaged. An expandable end 312 of a fastener 310 collapses as it is inserted through the opening and into the internal hollow 112. Once in the internal hollow 112, the fastener end 312 expands and is thus retained in the internal hollow 112. The fastener 310 also includes a portion 314 that abuts against the opposite side of the lip 116. In this manner, the lip 116 engages and structurally supports the fastener 310.

Figure 4:
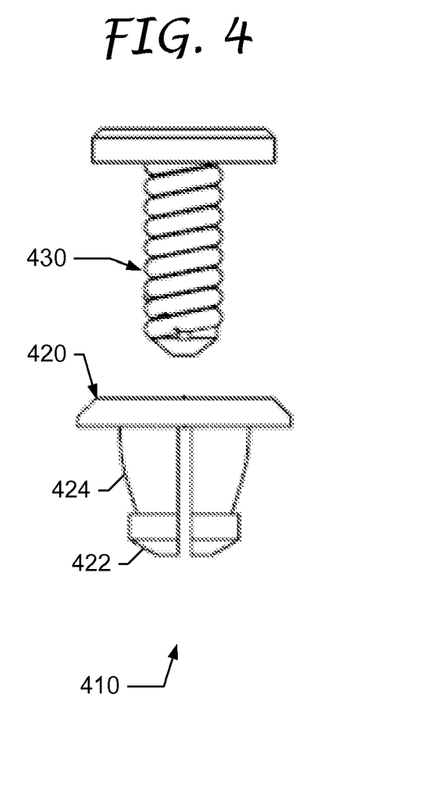
FIG. 4 is an illustration of a push-in fastener.

Reference is now made to FIG. 4. A different fastener may engage the lip in a different way. For example, consider a push-in fastener 410 including a collar 420 and a peg 430. A deformable end 422 of the collar 420 is collapsed as it is inserted through the opening 114 in the lip 116 of the fastener receptacle 110, and expands once it is past the opening 114. Members 424 of the collar 420 are tapered so they abut against the opposite side of the lip 116.

The peg 430 has external threads that correspond to internal threads in the collar 420. The peg 430 can be pushed into the collar 420, whereby the threads are engaged and the peg 430 is fastened to the collar 420. The peg 430 may have an anti-removal feature that allows it to be pushed into the collar 420, but removed from the collar 420 only by unscrewing it from the collar 420.

Plastic push-in fasteners offer several advantages over metallic fasteners. They are lighter in weight, corrosion-resistant, and lower in cost. They are also quicker to install, as they can simply be pushed onto their collars. Plastic push-in fasteners do not contain hazardous finishes (e.g., cadmium) typically seen in metallic fasteners.

Reference is once again made to FIG. 1. The receptacle 110, including the internal hollow 112, the lip 116, and the opening 114, is not limited to any particular geometry. For example, some embodiments of a receptacle 110 may include a cylindrical sleeve 118 having a cylindrical cavity 112 that is closed at one end 120, and an annular lip 116 that extends radially inward from the sleeve 118 and that is spaced apart from the closed end 120. The opening 114 in the annular lip 116 has a smaller inner diameter than the cylindrical cavity 112.

Reference is made to FIGS. 5a-7b, which illustrate three exemplary fastener receptacles 510, 610 and 710. All three receptacles 510, 610 and 710 have a cylindrical sleeve 520, 620 and 720 with a smooth cylindrical cavity 530, 630 and 730; a cap 540, 640 and 740 that closes off one end of the sleeve; and an inwardly extending annular lip 550, 650 and 750 spaced apart from the cap. All three fastener receptacles 510, 610 and 710 also have a flange 560, 660 and 760 extending outwardly from the sleeve 520, 620 and 720. Each cap/flange 540/560, 640/660 and 740/760 forms a gap. Each flange 560, 660 and 760 has two filling holes 570, 670, 770, one for injecting an adhesive into the gap, and another for observing when the adhesive has filled the gap.

Figure 5A:
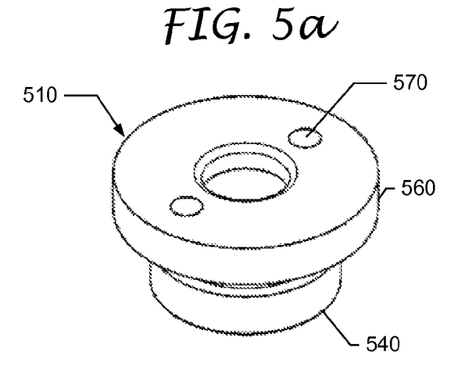
FIGS. 5a and 5b are illustrations of a first fastener receptacle.
Figure 5B:
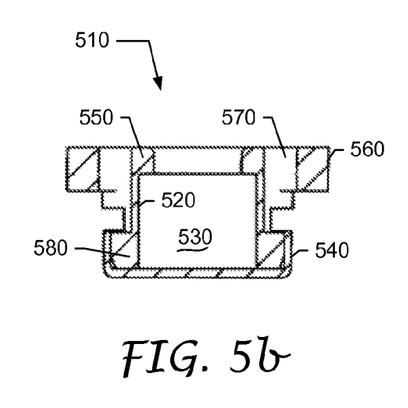
Figure 6A:
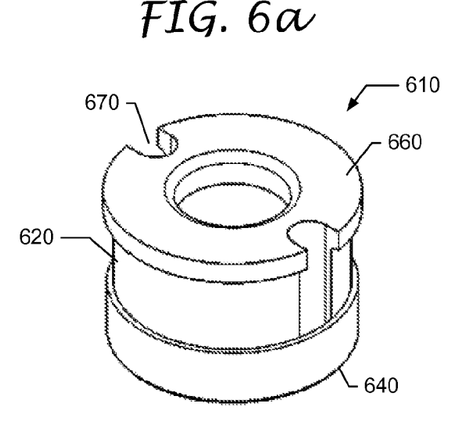
FIGS. 6a and 6b are illustrations of a second fastener receptacle.
Figure 6B:
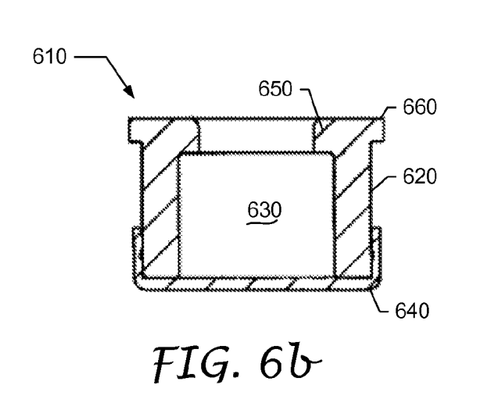

The receptacle 510 of FIGS. 5a-5b has a thicker flange 560 than the receptacle 610 of FIGS. 6a-6b. The thinner flange 660 of FIGS. 6a-6b can be sunk into the surface of a panel so it sits flush with the panel. The thicker flange 560 of FIGS. 5a-5b can sit proud of the panel surface and can be used as a standoff or spacer. The receptacle 510 of FIGS. 5a-5b also has an externally-extending flange 580 in the cap region to act as a standoff for electrical cooling.

Figure 7A:
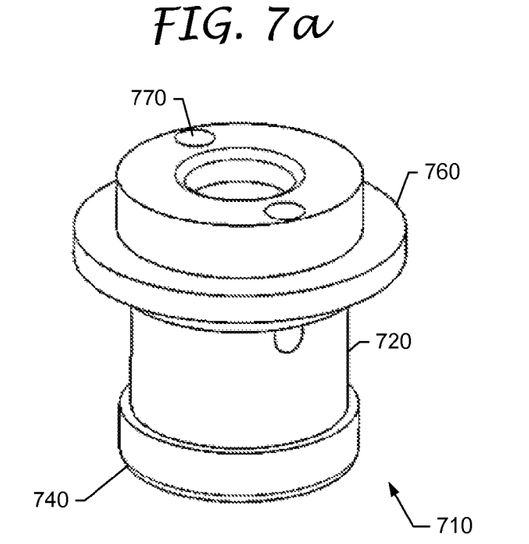
FIGS. 7a and 7b are illustrations of a third fastener receptacle.
Figure 7B:
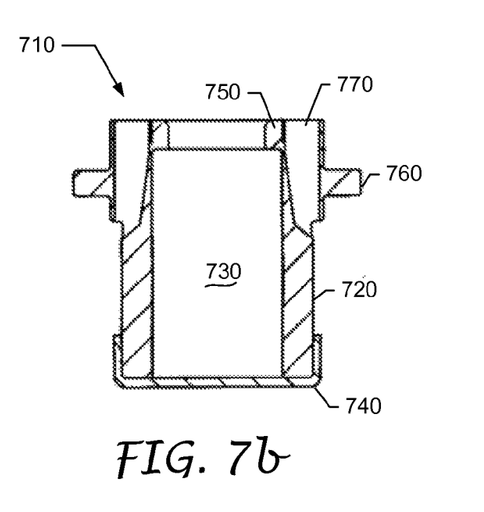

The receptacle 710 of FIGS. 7a-7b is similar to the receptacle 610 of FIGS. 6a-6b, except that the cylindrical sleeve 720 extends upward beyond the flange 760. The extended sleeve 720 provides greater spacing between the panel and a part.

Each configuration may have a peel-off installation tab. The tab is shaped to protect the receptacle from adhesive while the adhesive is being injected. The tab may also have a sticky substance where it contacts the panel's surface to hold the receptacle in place while the adhesive is being injected. Once the adhesive has cured, the tab can be peeled off and discarded.

Figure 7C:
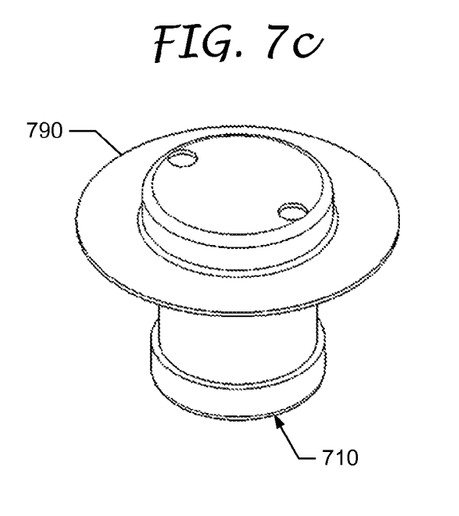
FIG. 7c is an illustration of an installation tab on the third fastener receptacle.

A peel-off installation tab 790 is shown in FIG. 7c. The installation tab 790, which is configured for the third fastener receptacle 710, may be made of a transparent plastic, but it is not so limited.

The composition of a receptacle described herein is not limited to anything in particular. For some embodiments, plastic offers advantages as it is lightweight, corrosion-resistant, and relatively inexpensive to fabricate. A receptacle can be formed by injection molding. A unitary piece can be fabricated, or multiple pieces (e.g., a sleeve and cap) can be fabricated and bonded together.

A receptacle described herein is not limited to a panel having a low density core. A receptacle described herein may be used in a panel having a core made of any material with sufficient thickness. Examples of materials for the core include, without limitation, solid wood (especially low density woods such as Balsa), plywood, plastics/plastic foam, and urethane foam.

A panel described herein is not limited to any particular application. However, a panel described herein is particularly advantageous for aircraft. For example, a panel described herein can be adapted for use as an interior panel of aircraft. A typical interior panel of an aircraft includes a honeycomb core sandwiched by front and back skins. The skins are typically made of one or more plies of fiberglass, carbon fiber, graphite, or aluminum. The back skin may be secured to another structure, such as a fuselage, such that the back skin is not accessible.

Figure 8A:
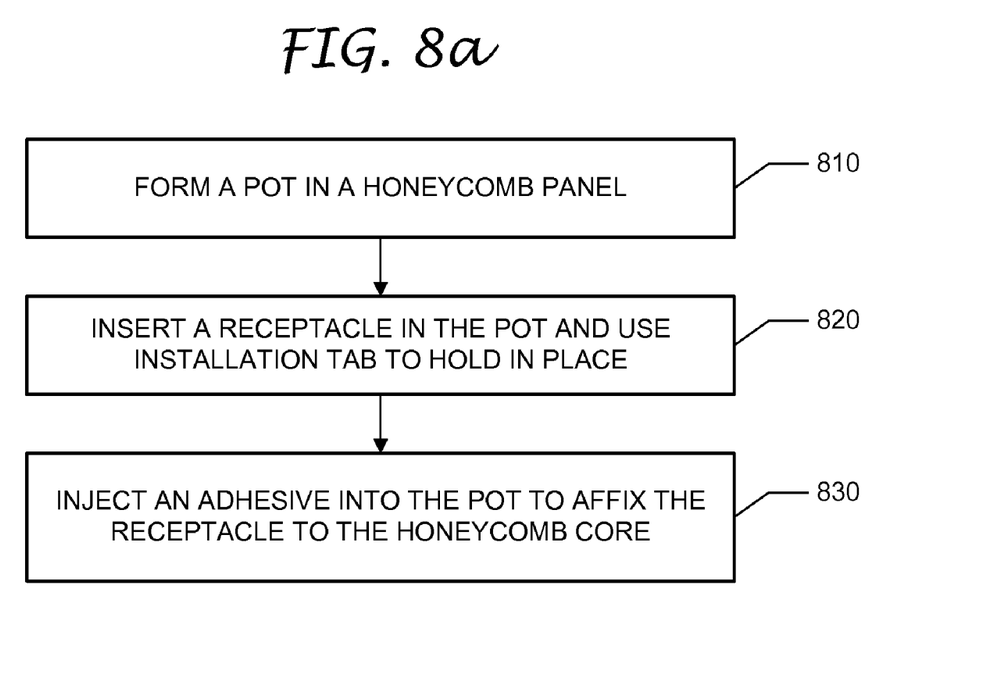
FIGS. 8a and 8b are illustrations of a method of installing a fastener receptacle in a honeycomb panel.

Reference is now made to FIG. 8a, which illustrates a method of adapting a honeycomb panel to accommodate surface mounted parts. At block 810, a pot is formed in the honeycomb panel. The pot may be formed by boring a hole into the skin and honeycomb core for the sleeve and counterboring a hole for the flange.

At block 820, a receptacle is inserted in the pot. An installation tab may be used to hold the receptacle in place.

At block 830, an adhesive (e.g., an epoxy, urethane, silicone) or potting compound is injected into the pot to affix the receptacle to the honeycomb core. The adhesive or potting compound may be injected through one of the filling holes. Filling is complete when adhesive or potting compound emerges from the other filling hole. After the adhesive or potting compound has hardened, the installation tab may be removed.

Figure 8B:
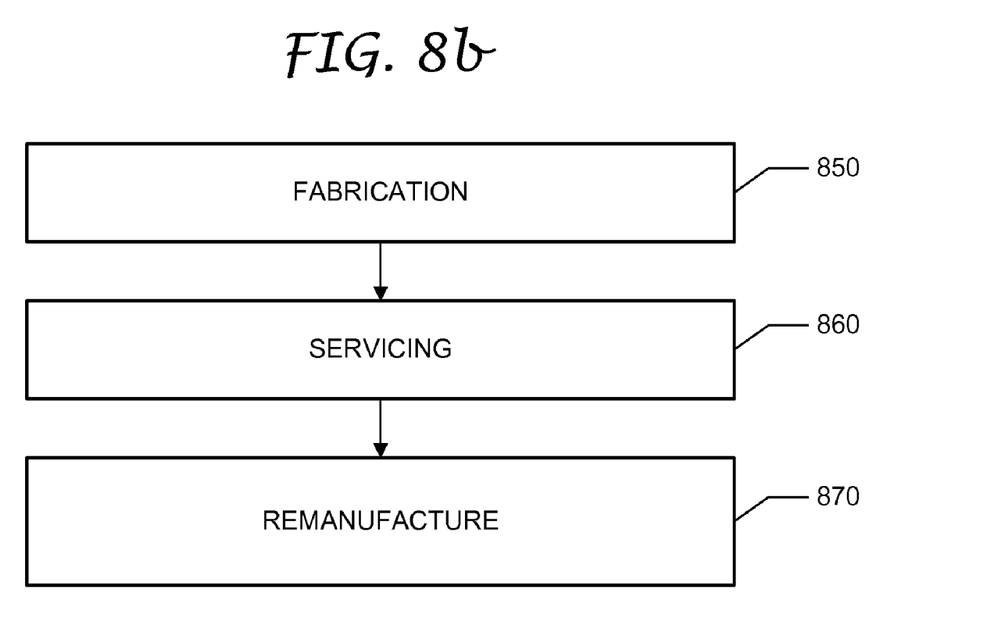

Reference is now made to FIG. 8b. The method of FIG. 8 may be performed during any of fabrication (block 850), servicing (block 860) and remanufacture (block 870) of aircraft panels.

In some embodiments, receptacles can be built into aircraft panels during panel manufacture. For instance, receptacles could be molded into a panel during injection molding of the panel. In such embodiments, the receptacles are made of a heat resistant material such as aluminum.

A fastening system described herein includes a receptacle and a push-in fastener. This fastening system is especially advantageous for aircraft interior panels. As mentioned above, it is lighter in weight, corrosion-resistant, and lower in cost than metallic fasteners. In addition, it is quicker to install, as a peg, for example, can simply be pushed onto its collar without the use of tools. Considering that an aircraft might need hundreds or even thousands of fastening systems for mounting parts to interior panels, these advantages are significant.

The receptacles described herein are more aesthetically pleasing and may be more aesthetically desirable than receptacles that extend from the front skin to the back skin of the panel. A receptacle herein can be used as a blind insert/receptacle.

The receptacles in the aircraft interior panel allow parts not requiring the strength of a typical threaded metal fastener to be surface mounted to the panel. Examples of such parts include, but are not limited to, electrical clamps, ducting and hose clamps, electrical stand-offs and ring posts, retainer clips, plastic sheets, and decorative parts (e.g., kick strips, trims and caps). The receptacle also allows these parts to be removed.

Figure 9A:
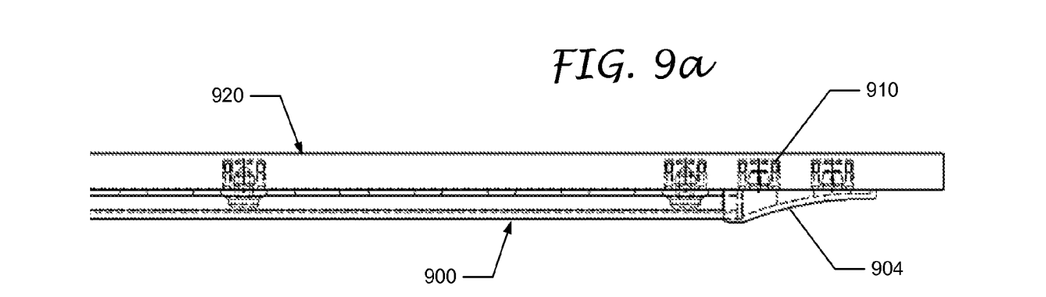
FIGS. 9a-9b are illustrations of a part that is fastened to a panel.

Reference is made to FIG. 9a, which illustrates a part 900 attached to a fastener receptacles 910 in an aircraft interior panel 920. The part 900 illustrated in FIG. 9a is a decorative part such as a kick strip. The part 900 includes integral fasteners.

Figure 9B:
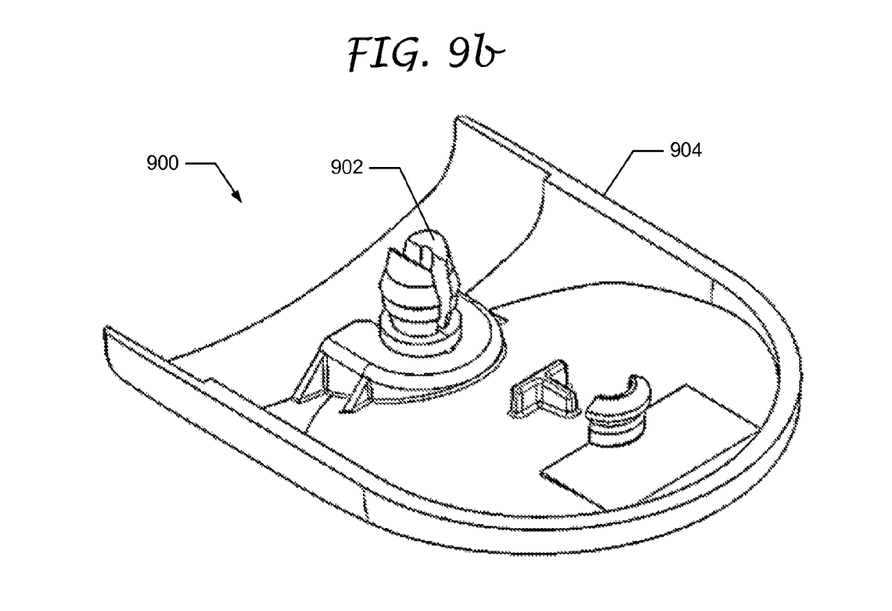

Additional reference is made to FIG. 9b, which shows integral fasteners 902 for an end portion 904 of the part 900. The integral fasteners 902 may include flexible members that terminate in prongs. The prongs are forced inward as they are pushed through the opening and past the lip of a receptacle 910. The prongs move outward after the prongs have been pushed past the opening. Each receptacle lip is engaged between the prongs and the part 900.

The integral fasteners 902 are not limited to prongs. As but one example, the integral fasteners may include rubber molded plugs.

Figure 10:
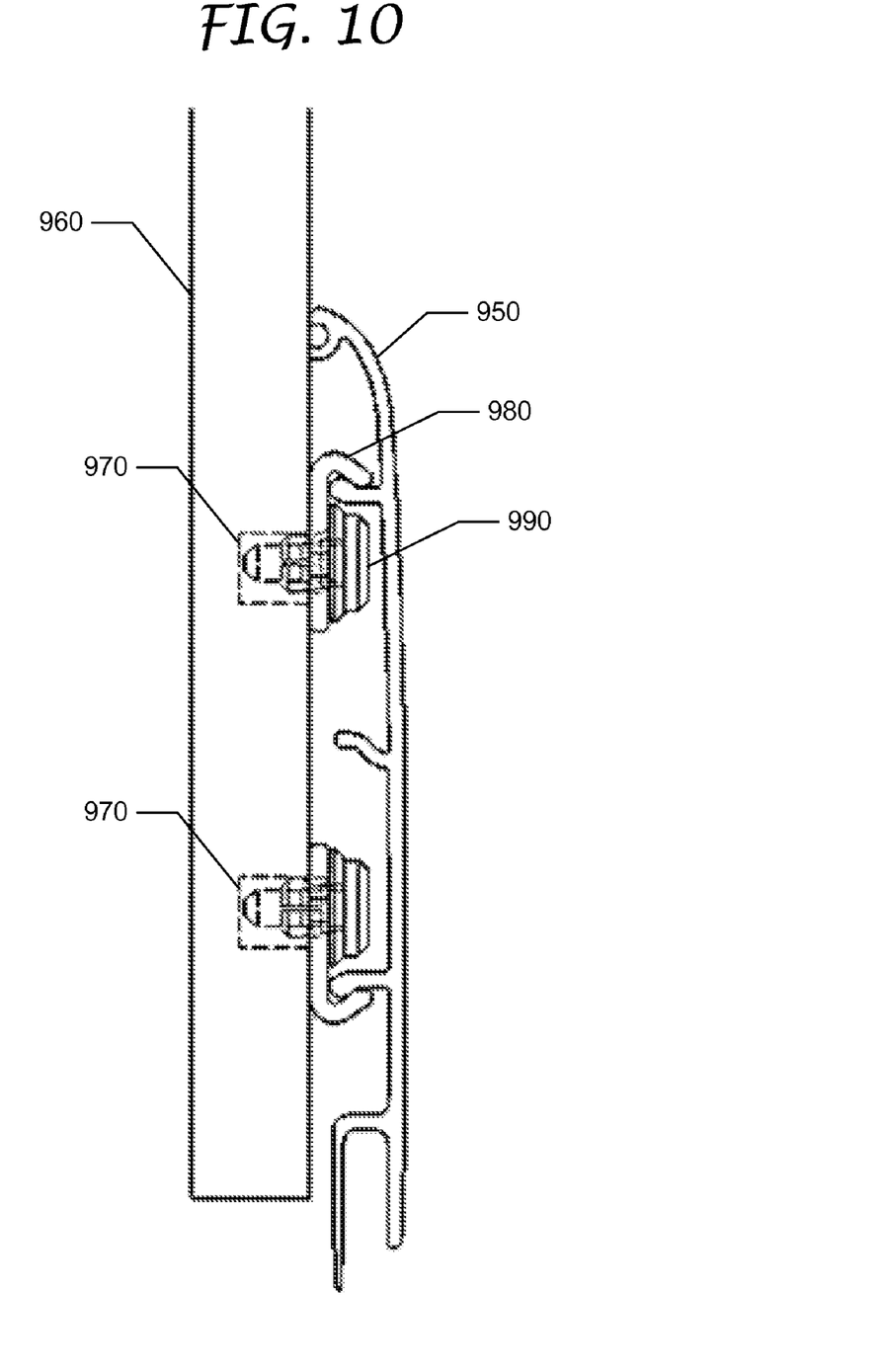
FIG. 10 is an illustration of a part that is fastened to a panel.

Reference is now made to FIG. 10, which shows an alternative approach for fastening a decorative part 950 (e.g., a kick strip) to a panel 960 having fastener receptacles 970.

Retainer clips 980 are attached to the fastener receptacles 970 by push-in fasteners 990. The part 950 is secured to the retainer clips 980.

The invention claimed is:

1. A panel comprising:
a core;
a fastener receptacle extending into and affixed to the core, the fastener receptacle including a sleeve that forms a cylindrical cavity, a cap that closes one end of the sleeve, and an annular lip that forms and opening at an opposite end of the sleeve, the lip configured to engage and structurally support a push-in fastener, the opening have a smaller diameter than the cavity's inner diameter, the fastener receptacle further including an outward-extending flange spaced apart from and forming a gap with the cap, the flange including an opening for injecting an adhesive into the gap; and
a plastic push-in fastener fastening to only the lip of the receptacle.

2. The panel of claim 1, wherein the panel includes a low density core and a skin covering the low density core.

3. The panel of claim 2, wherein the low density core is a honeycomb core.

4. The panel of claim 1, further comprising means for affixing the receptacle to the core.

5. The Panel of claim 2, wherein the lip is flush with the skin.

6. The panel of claim 2, wherein the lip sits proud of the skin.

7. The panel of claim 1, further comprising a removable installation tab for protecting the receptacle from adhesive when the adhesive is injected around the receptacle and for holding the receptacle in place while the adhesive is being injected.

8. An aircraft interior panel comprising a honeycomb core, a skin covering a surface of the honeycomb core, a plurality of push-in fasteners, and a corresponding plurality of fastener receptacles, each receptacle extending through the skin and into the core, each receptacle affixed to the core, each receptacle including a smooth cylindrical cavity having a closed end, and an inwardly-extending annular lip spaced apart from the closed end, the annular lip forming an opening to the cavity, the opening having a smaller diameter than the cavity's diameter, each push-in fastener engaging only the lip of its corresponding receptacle.

9. The panel of claim 8, wherein the plurality of push-in fasteners are made of plastic.

10. An assembly comprising the aircraft interior panel of claim 8, and a part having integral push-in fasteners for engaging the annular lips of corresponding receptacles in the panel.

11. A method of surface mounting a part to the panel of claim 8, the method comprising aligning the part with the receptacles; and inserting the push-in fasteners into their corresponding receptacles.

12. A method of fabrication comprising adding the receptacles to the panel of claim 8 during fabrication of the panel.

* * * * *